J. RUSSELL.
Harrow.
No. 26,864.
Patented Jan. 17, 1860.
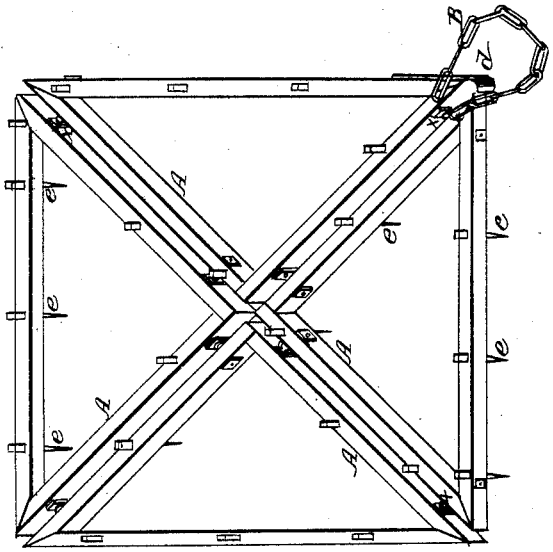
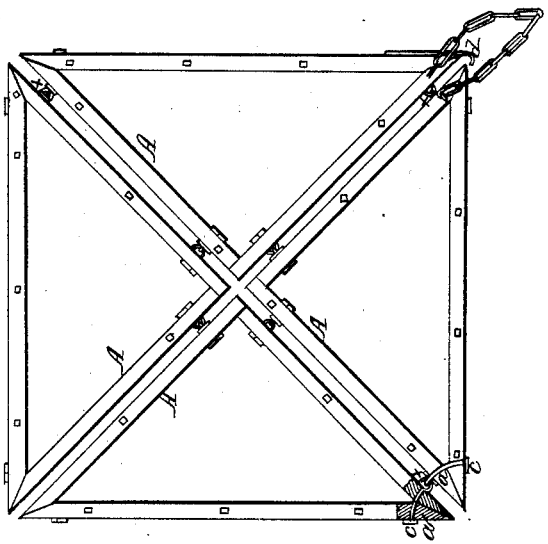
Witnesses:
C. M. Alexander
A. H. Yeatman
Inventor:
John Russell

United States Patent Office.

JOHN RUSSELL, OF GRAMPIAN HILLS, PENNSYLVANIA.

IMPROVEMENT IN HARROWS.

Specification forming part of Letters Patent No. 26,864, dated January 17, 1860.

*To all whom it may concern:*

Be it known that I, JNO. RUSSELL, of Grampian Hills, in the county of Clearfield and State of Pennsylvania, have invented certain new and useful Improvements in Flexible Harrows; and I do hereby declare that the following is a full, clear, and exact description of the same, reference being had to the accompanying drawings, and to the letters of reference marked thereon.

The nature of my invention consists in the arrangement and construction of those parts which will be hereinafter particularly described.

In the annexed drawings, Figures 1 and 2 represent plan views, seen in different positions.

In the figures, A A A A represent four triangular harrows, the right angles of which being brought together, they form one square harrow, which is flexible, as is fully seen.

The harrows A are made of any required size or material, and are provided with teeth on their under side, as all other harrows for harrowing the ground are.

*d* represents a shield, which consists of a piece of metal which is secured at one end to one of the harrows, the other end of which is bent, as seen in the figures, to cover the opening between the two contiguous front harrows. The chain B, by which the harrows are drawn, is attached, as seen, to two of said harrows, and when they move forward the angle formed by said harrows being foremost, the space between them is liable to be filled with stubble and weeds. The shield *d* covers this space or opening and guides the stubble and weeds off to one side.

*a a* represent bolts, which pass through and secure the miter-joints of the several harrows together. One end of these bolts is provided with a screw, over which passes a nut. Their other ends are provided with loops, which pass into each other at the adjoining ends of the harrows, and serve to secure said harrows together.

The nuts serve to secure the miter ends together firmly when passed over the screws on the bolts, and the loops serve to connect the harrows, so that they will be flexible to accommodate themselves to all the inequalities of the ground over which they pass.

I do not lay any claim to connecting generally four harrows together for forming one large flexible harrow, as this has been done before; but,

Having thus fully described my invention, what I claim as new, and desire to secure by Letters Patent, is—

The arrangement of triangular harrows A A A A and bolts *a a* with the shield *d*, the whole being constructed as and for the purpose herein specified.

JOHN RUSSELL.

Witnesses:
  C. M. ALEXANDER,
  A. A. YEATMAN.